No. 846,163. PATENTED MAR. 5, 1907.
W. F. STUBINGER.
COFFEE URN.
APPLICATION FILED JULY 5, 1906.
2 SHEETS—SHEET 2.
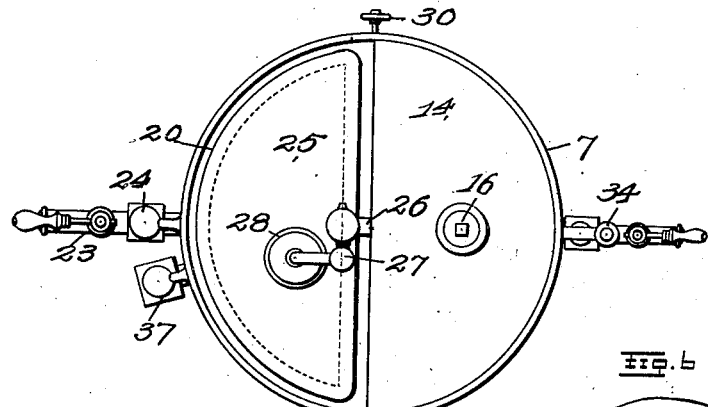
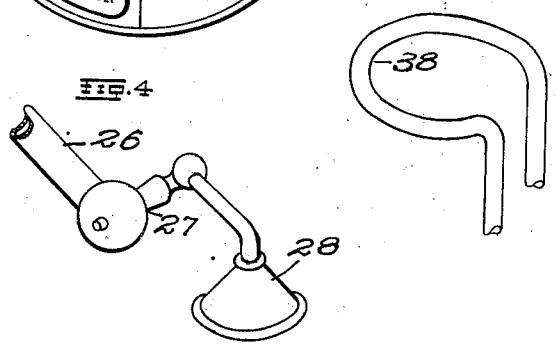
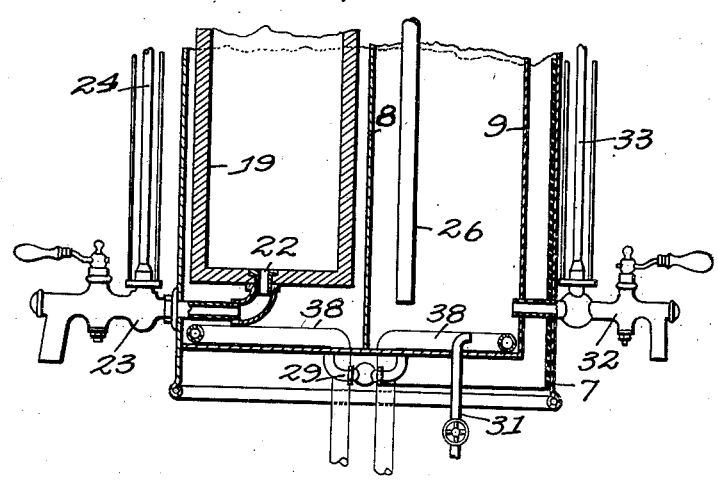
Witnesses
W. C. Stein
L. A. L. McIntyre
Inventor
William F. Stubinger
by Hopkins & Ennis attys

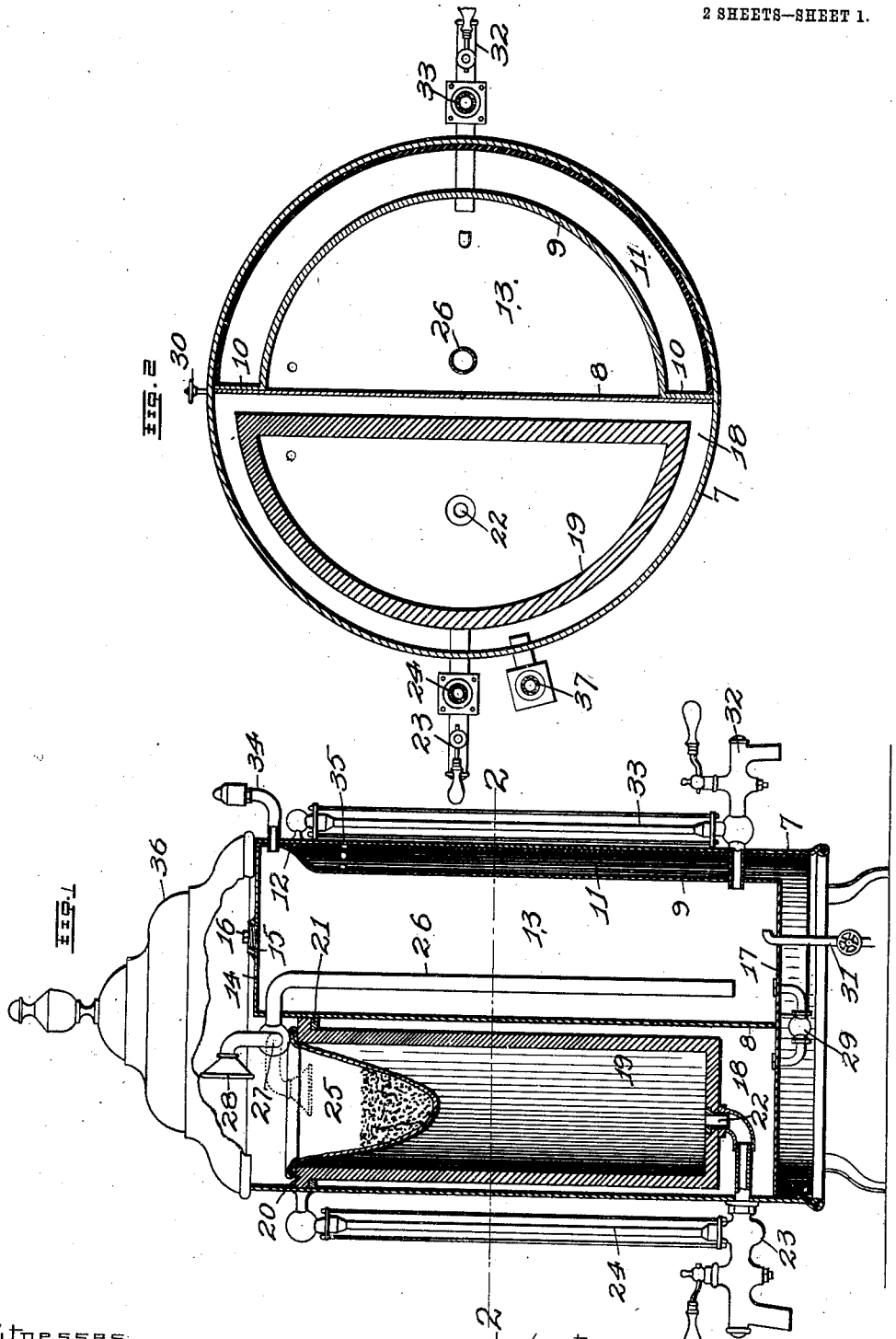

UNITED STATES PATENT OFFICE.

WILLIAM F. STUBINGER, OF ST. LOUIS, MISSOURI.

COFFEE-URN.

No. 846,163.

Specification of Letters Patent.

Patented March 5, 1907.

Application filed July 5, 1906. Serial No. 324,887.

*To all whom it may concern:*

Be it known that I, WILLIAM F. STUBINGER, a citizen of the United States, and a resident of St. Louis, Missouri, have invented certain new and useful Improvements in Coffee-Urns, of which the following is a specification.

This invention relates to improvements in coffee-urns, and consists in the novel arrangement, construction, and combination of parts, as will be fully hereinafter described and claimed.

The object of my invention is to construct a coffee-urn having the water-compartment arranged to permit the heat to pass under and around the same, providing a large heating-surface.

A further object of my invention is to provide the water-heating compartment with a large heating area and a coffee-compartment in which a stone coffee-receptacle is suspended.

In the drawings, Figure 1 is a vertical central sectional view of my complete invention, showing the internal construction. Fig. 2 is a horizontal sectional view taken on the line 2 2 of Fig. 1. Fig. 3 is a top plan view of the same with cover removed. Fig. 4 is a detail perspective view of the siphon-nozzle made use of in connection with my invention. Fig 5 is a detail sectional view of the lower portion of my improved urn, showing the application of a steam-heating device. Fig. 6 is a detail perspective view of a modified heating device.

In the construction of the device as shown I provide an outer casing 7, which is provided with a division-wall 8. Against the division-wall I secure a vertical sheet 9 of material, the ends 10 bend outwardly, and secured to the partition forming a leak-proof joint and between the sheet 9 and outer casing is formed a space 11, through which the heat radiates. The upper end 12 of the sheet is bent outwardly and secured to the upper end of the casing 7 to prevent the heat from escaping at that point; the sheet 9, together with the division-wall 8, forming a water-receptacle 13, in which the water to be boiled is located. The top of the receptacle is provided with a cover 14, in which is provided a clean-hole 15 and closed by means of a plug 16.

The bottom 17 is formed by a sheet of material covering the entire lower end of the water-receptacle 13 and is continued on, forming the bottom for the receptacle 18, in which is suspended a coffee-receptacle 19, made of earthenware or the like.

The upper end of the coffee-receptacle 19 is provided with a flange 20, by which the receptacle is suspended upon a rim 21, secured to the inner surface of the outer casing and to one side of the division-wall 8. The lower end of the coffee-receptacle is provided with an outlet 22, to which a faucet 23 is attached, and connected with the faucet is a gage 24 to indicate the amount of coffee contained within the receptacle.

Upon the top of the coffee-receptacle 19 is located a coffee-bag 25 and is supported upon the flange 20.

Within the receptacle 13 is suspended a siphon-pipe 26, its upper end passing through the upper end of the division-wall 8, and to it is connected a valve 27, which is automatically opened when the nozzle 28 is placed in horizontal position, as shown by dotted lines in Fig. 1, and closed when in vertical position, as shown by solid lines in Fig. 1. The purpose of this siphon is to admit boiling water from the water-receptacle 13 into the coffee-receptacle 19 and to spray the boiling water upon the coffee-grounds contained within the bag 25.

The water-receptacle 13 is connected to the receptacle 18 by means of the valve-controlled connection 29, and this valve is operated by a hand-wheel 30, projecting through the wall 7 of the casing. Water is admitted into the water-receptacle 13 through the supply-pipe 31, which is connected to any suitable source of supply, and to the water-receptacle 13 is attached a faucet 32, having an indicator 33 to indicate the amount of water contained therein. The upper end of the water-receptacle is provided with a safety-valve 34 to relieve the overpressure of steam which might accumulate therein.

Beneath the bottom 17 is placed the burner, which may be of gas or gasolene, and the heat has a tendency to pass upwardly through the passage 11, heating the greater portion of the receptacle 13, and is permitted to pass out through the small openings 35, formed in the casing 7. The object of closing the passage 11 at the top is to prevent the heat from passing into the cover 36.

In the receptacle 18 I provide a sufficient amount of water to keep the coffee-receptacle 19 sufficiently heated, and to this receptacle I provide an indicator 37 to show the amount of water contained therein.

If desired, I may place within the receptacles 18 and 17 a coil 38, which is connected to a steam-supply, and in the use of this coil the gas or gasolene burners are dispensed with. This arrangement is only used in cases where there is steam-supply.

Having fully described my invention, what I claim is—

1. A coffee-urn comprising an outer casing, a division-wall located within said casing, a water-heating receptacle located to one side of the division-wall, and forming a heating-space between the outer casing and the wall of the receptacle, a receptacle located on the other side of the division-wall, a coffee-receptacle suspended in the last-named receptacle, a faucet connected to the coffee-receptacle by which the contents may be withdrawn, a coffee-bag suspended into the coffee-receptacle, and a siphon extending into the water-receptacle, and permitting a spray of boiling water to be brought in contact with the coffee in the bag, substantially as specified.

2. A coffee-urn comprising an outer casing, a division-wall located within said casing, a water-heating receptacle located to one side of the division-wall, and forming a heating-space between the outer casing and the wall of the receptacle, a receptacle located on the other side of the division-wall, a coffee-receptacle suspended in the last-named receptacle, a faucet connected to the coffee-receptacle by which the contents may be withdrawn, a coffee-bag suspended into the coffee-receptacle, and a siphon extending into the water-receptacle, and permitting a spray of boiling water to be brought in contact with the coffee in the bag, and a valve-controlled connection between the two receptacles in the casing, and a water-supply pipe admitting water into the water-receptacle, substantially as specified.

3. A coffee-urn comprising an outer casing, two receptacles formed in said casing, one of said receptacles being of smaller diameter than the casing forming a space between the two into which the heat may radiate, a coffee-receptacle suspended in one-half of the casing, a siphon connecting the water-receptacle with the coffee-receptacle, a self opening and closing valve carried by the siphon for admitting water into the coffee-receptacle, and a valve-controlled connection between the two receptacles formed in the casing for admitting water from one to the other, and suitable gages whereby the contents may be ascertained in the various receptacles, substantially as specified.

4. A device of the class described, comprising an outer casing, a water-receptacle formed in said casing of smaller diameter, and arranged to permit the heat to contact with the bottom, and half of its circumference, the upper end of the water-receptacle connected to the upper end of the outer casing, a coffee-receptacle suspended in half of the outer casing, and forming sufficient space for the surrounding of heated water, substantially as specified.

In testimony whereof I have signed my name to this specification in presence of two subscribing witnesses.

WILLIAM F. STUBINGER.

Witnesses:
ALFRED A. EICKS,
WALTER C. STEIN.